United States Patent [19]

Murayama

[11] Patent Number: 5,190,769
[45] Date of Patent: Mar. 2, 1993

[54] APPARATUS FOR FORMING ANNULAR LINER

[75] Inventor: Kashiwa Murayama, Fujisawa, Japan

[73] Assignee: Japan Crown Cork Co., Ltd., Japan

[21] Appl. No.: 826,826

[22] Filed: Jan. 28, 1992

[30] Foreign Application Priority Data

Feb. 13, 1991 [JP] Japan .................................. 3-40450

[51] Int. Cl.⁵ ............................................. B29C 63/00
[52] U.S. Cl. .................................. 425/113; 264/268;
413/58; 425/126.1; 425/129.1; 425/561; 425/809
[58] Field of Search ...................... 413/58, 60; 425/110,
425/113, 114, 126.1, 127, 129.1, 557, 558, 561,
809; 264/268, DIG. 60

[56] References Cited

U.S. PATENT DOCUMENTS

| | | | |
|---|---|---|---|
| 3,135,019 | 6/1964 | Aichele | 425/127 |
| 3,212,131 | 10/1965 | Aichele | 425/809 |
| 4,388,058 | 6/1983 | Kubo | 425/809 |
| 4,412,797 | 11/1983 | Murayama | 425/110 |
| 5,035,594 | 7/1991 | Murayama et al. | 425/126.1 |
| 5,071,339 | 12/1991 | Murayama et al. | 425/126.1 |

FOREIGN PATENT DOCUMENTS

| | | | |
|---|---|---|---|
| 462513 | 12/1991 | European Pat. Off. | 413/58 |
| 56-98131 | 8/1981 | Japan | 413/58 |

Primary Examiner—Jay H. Woo
Assistant Examiner—Scott Bushey
Attorney, Agent, or Firm—Beveridge, DeGrandi, Weilacher

[57] ABSTRACT

An apparatus for forming an annular liner is equipped with a molding assembly which includes a press tool assembly and an anvil. The container closure shell is fed onto the anvil. The press tool assembly has a resin flow path and a means for forcibly flowing a synthetic resin material through the resin flow path. A notch is formed in the upstream portion of the resin flow path. When the molding assembly moves with respect to the feeding nozzle, the synthetic resin material discharged from the discharge port of a feeding nozzle enters into the upstream portion of the resin flow path via the notch, and is cut away from the feeding nozzle.

5 Claims, 13 Drawing Sheets

APPARATUS FOR FORMING ANNULAR LINER

FIELD OF THE INVENTION

The present invention relates to an apparatus for forming an annular liner in a container closure shell of a container closure such as a bottle closure and a can closure.

DESCRIPTION OF THE PRIOR ART

It is widely accepted practice to provide the inside surface of the top panel of a container closure shell made of a thin metal plate or a synthetic resin with a liner that is molded from a relatively soft synthetic resin in order to impart desired excellent sealability to the container closure, as is commonly known among people skilled in the art. A disk-like liner is provided in many cases when the container closure shell has a relatively small internal diameter. When the container closure shell has a relatively large internal diameter. however, it is desired that only the peripheral edge of the top panel is provided with an annular liner from the standpoint of saving the liner material.

The annular liner of a synthetic resin is usually formed by the so-called spin lining method according to which an unfoamed synthetic resin material under the softened condition is supplied to the peripheral edge in the top panel of the container closure shell, and then heated to foam. The foaming synthetic resin such as foaming vinyl chloride resin used for the spin lining method is, however relatively expensive and moreover, a sanitary problem is pointed out though it has not yet been confirmed. In recent years, therefore, it has been proposed to form an annular liner of a synthetic resin by the press molding that is ordinarily used for forming a disk-like liner.

Japanese Patent Publication No. 58088/1988 (U.S. Pat. No. 4,388,058) discloses a press-molding apparatus for press-molding an annular liner of a synthetic resin on the inside surface of the top panel of a container closure shell. This press-molding apparatus comprises an anvil and a press tool assembly which is disposed above the anvil and moves in a direction to approach and separate away from the anvil. The press tool assembly includes a punch member, a cylindrical bushing member arranged on the outside of the punch member and a cylindrical sleeve member arranged on the outside of the bushing member. The container closure shell fed with a molten synthetic resin material in an annular form on the inside surface of the top panel thereof is positioned on the anvil, and the press tool assembly enters into the container closure so that the annular synthetic resin material is press-molded into an annular liner. As for a system for feeding the annular synthetic resin material onto the inside surface of top panel of the container closure shell, the above Japanese Patent Publication No. 58088/1988 quotes Japanese Laid-Open Patent Publication No. 77523/1980 (U.S. Pat. No. 4,412,797) instead of giving a concrete description. This Japanese Laid-Open Patent Publication No. 77523/1980 discloses a system in which a molten synthetic resin is extruded by an extruder via an annular discharge port and is fed onto the inside surface of top panel of the container closure shell.

However, the conventional apparatus for forming an annular liner on the inside surface of top panel of the container closure shell is complex in construction and is expensive since a very complicated mechanism is required to feed the synthetic resin material in an annular form onto the inside surface of top panel of the container closure shell. Moreover, a considerable period of time is required for forming the liner making it difficult to achieve the molding highly efficiently.

SUMMARY OF THE INVENTION

An object of the present invention, therefore, is to solve the above-mentioned problems inherent in the conventional apparatus for forming an annular liner by employing a particular system for feeding the synthetic resin material without requiring a complex and expensive mechanism, and enabling the synthetic resin material that is necessary for press-molding the annular liner to be fed as required and sufficiently quickly.

In order to achieve the above object according to the present invention, (a) a press tool assembly is provided with a resin flow path that extends from an open upstream end up to space where a bushing member moves up and down between a punch member and a sleeve member and with a means for forcibly flowing the resin, and the upstream end of the resin flow path has a notch formed at a position on the downstream side in a direction in which a molding means moves, (b) a means for feeding a resin material has a feeding nozzle with a discharge port positioned being faced to the upstream end of the resin flow path, and (c) when the molding means moves passing through the resin material receiving zone, a molten synthetic resin material discharged from the discharge port of the feeding nozzle enters into the resin flow path through the above notch and is cut away from the discharge port of the feeding nozzle and then the synthetic resin material in the resin flow path flows passing through the resin flow path by the action of the means for forcibly flowing the resin.

That is, according to the present invention, there is provided an apparatus for forming an annular liner on the inside surface of a container closure shell comprising:

a molding means which is conveyed through a container closure shell receiving zone, a resin material receiving zone a molding zone and a container closure discharge zone in the order mentioned or is conveyed through said resin material receiving zone and said container closure shell receiving zone in the order contrary to the above;

a container closure shell feeding means which feeds a container closure shell having a circular top panel to said molding means in said container closure shell receiving zone;

a resin material feeding means which feeds a synthetic resin material to said molding means in said resin material receiving zone; and a container closure discharge means which discharges the container closure consisting of a container closure shell and an annular liner formed on the inside surface of the top panel from said molding means in said container closure discharge zone; wherein said molding means includes an anvil on which the container closure shell is placed in an inverted state, and a press tool assembly which is disposed over said anvil being faced thereto and moves in a direction to approach or separate away from said anvil;

said press tool assembly includes a punch member, a cylindrical bushing member arranged on the outside of said punch member and a cylindrical sleeve member arranged on the outside of said bushing member, said bushing member being allowed to ascend or descend relative to said punch member and said sleeve member;

said press tool assembly further includes a resin flow path that extends from an open upstream end up to space where said bushing member ascends and descends between said punch member and said sleeve member and a means for forcibly flowing the resin, and the upstream end of said resin flow path has a notch formed at a position on the downstream side in a direction in which said molding means moves;

said resin material feeding means includes a feeding nozzle with a discharge port positioned to face said upstream end of said resin flow path in said resin material receiving zone;

when said molding means moves through said resin material receiving zone, a molten synthetic resin material discharged from said discharge port of said feeding nozzle enters into said resin flow path through said notch and is cut away from said discharge port of said feeding nozzle and then, the synthetic resin material in the resin flow path flows through the resin flow path by the action of said means for forcibly flowing the resin; and in said molding zone, said bushing member is lowered with respect to said punch member and said sleeve member, and the synthetic resin material is carried onto the inside surface of the top panel of the container closure shell and is molded into an annular liner.

In the apparatus for forming an annular liner of the present invention, a synthetic resin material is automatically fed to the upstream end of the resin flow path formed in the press tool assembly at a moment when the molding means moves through the resin material receiving zone, and is allowed to flow through the resin flow path by the action of the means for forcibly flowing the resin. Therefore, the synthetic resin material is fed without requiring extended periods of time, so that the annular liner is formed highly efficiently. In addition, the mechanism for feeding the resin material is considerably simpler than the conventional mechanisms. Accordingly, the entire apparatus is constructed simply and at lower cost compared with the conventional apparatus.

DETAILED DESCRIPTION OF THE PREFERRED EMBODIMENTS

Embodiments of the apparatus for forming an annular liner constituted according to the present invention will now be described in further detail in conjunction with the accompanying drawings.

Figure 1:
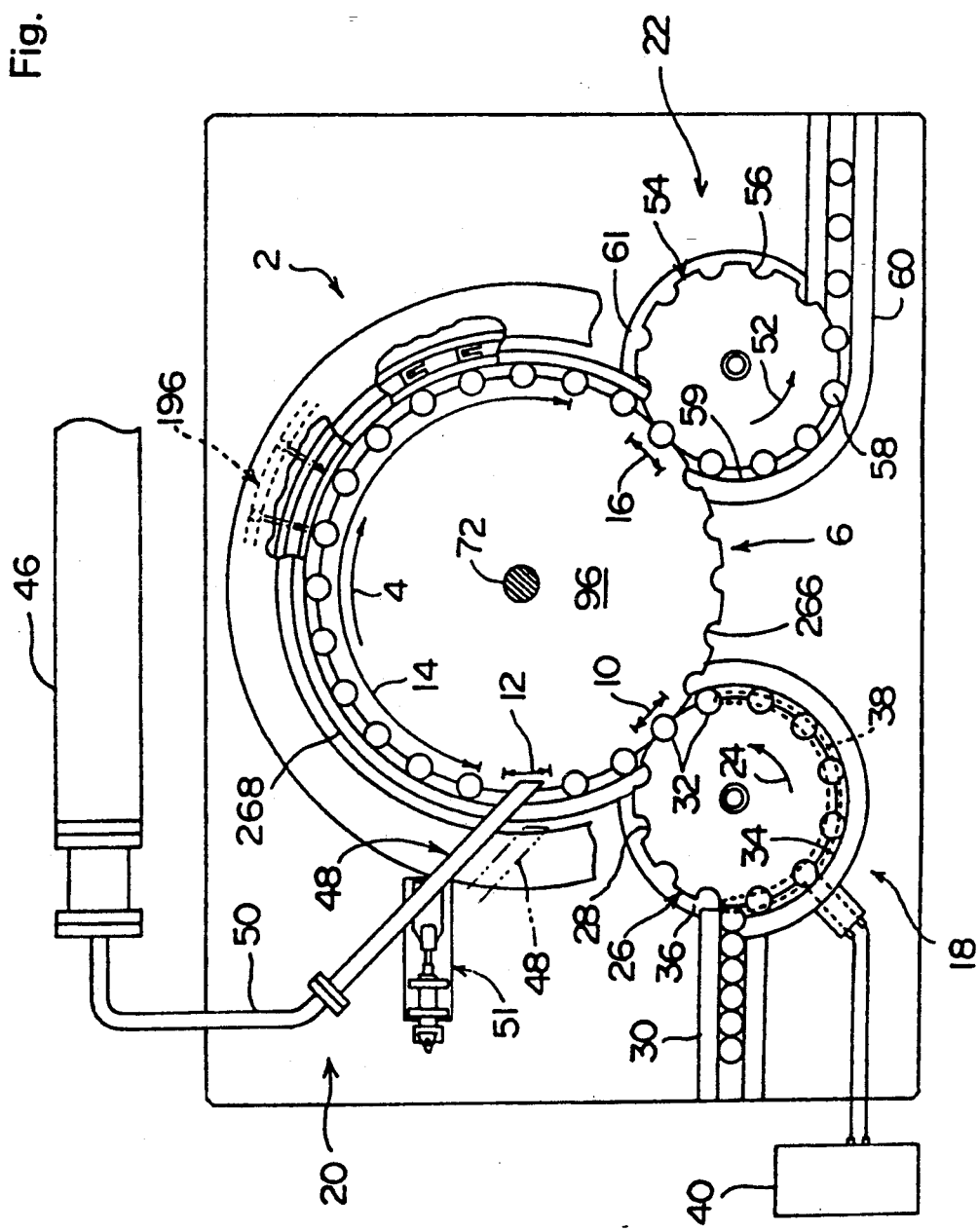
FIG. 1 is a schematic plan view showing a whole apparatus for forming an annular liner constituted according to an embodiment of the present invention.

Referring to FIG. 1, the apparatus for forming a liner is equipped with a main rotary molding device as generally designated at 2. As will be described later in further detail, the main molding device 2 includes a rotary support member 6 that is continuously rotated in a direction indicated by arrow 4 with an axis that substantially extends vertically (in a direction perpendicular to the surface of paper in FIG. 1) as a center, On the support member 6 are mounted a plurality of (twenty-four in the illustrated case) molding means 8 (FIG. at an equal distance in the circumferential direction. As the support member 6 is continuously rotated in the direction indicated by arrow 4, each of the molding means 8 moves along a circular moving path successively passing a container closure shell receiving zone 10, a resin material receiving zone 2, a molding zone 14 and a container closure discharge zone 16. If desired, the container closure shell receiving zone 10 and the resin material receiving zone 12 are arranged in the reverse order, such that the molding means 8 will pass the container closure shell receiving zone 10 after having passed the resin material receiving zone 12.

Figure 6:
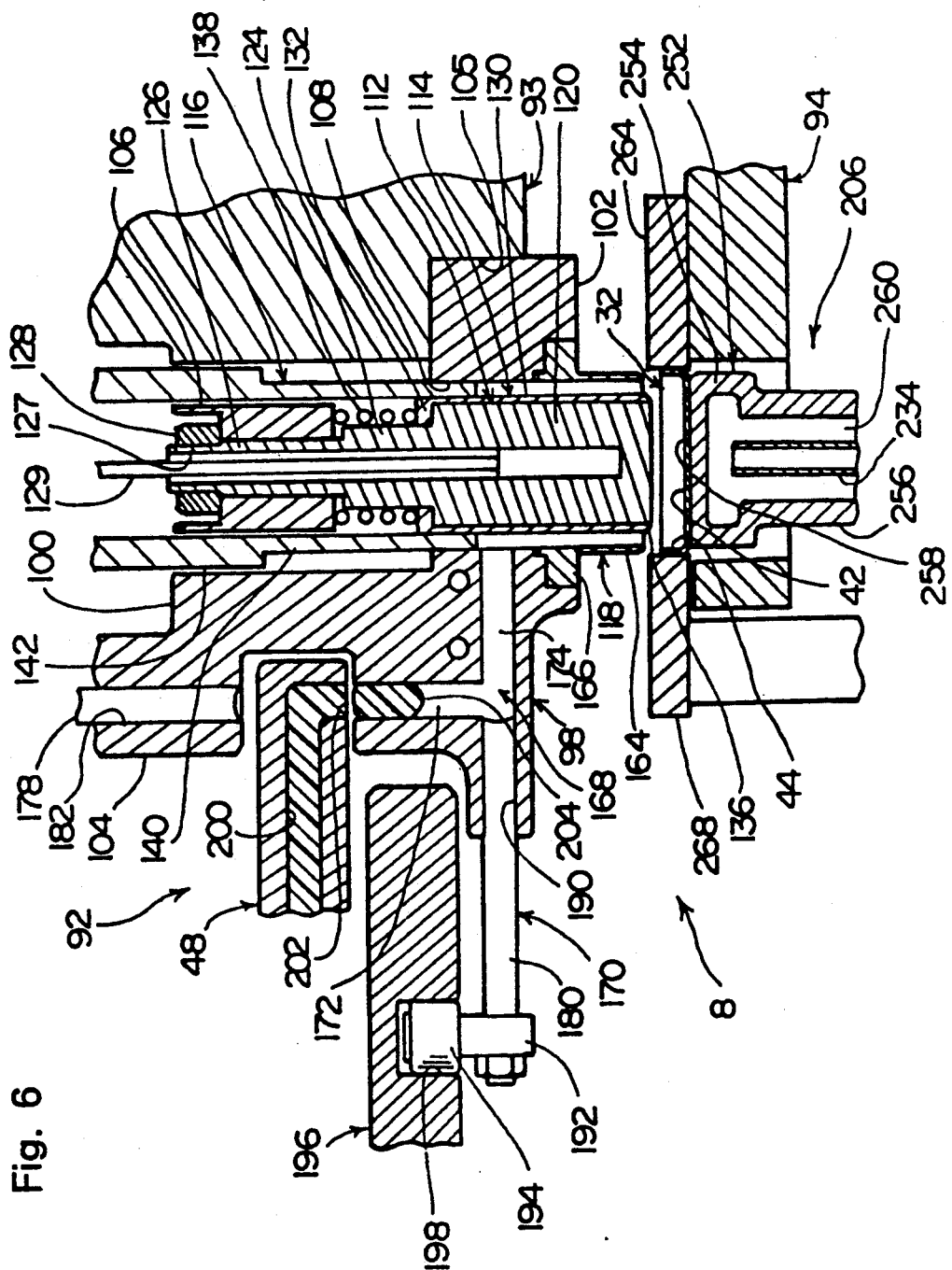
FIG. 6 is a partial sectional view for explaining the action of the main rotary molding device of FIG. 2.

A container closure shell feeding means 18 is disposed in relation to the container closure shell receiving zone 10, a resin material feeding means 20 is disposed in relation to the resin material receiving zone 12, and a container closure discharge means 22 is disposed in relation to the container closure discharge zone 16. The container closure shell feeding means 18 in the illustrated embodiment is constituted by a rotary turret mechanism and includes a turret 26 that continuously rotates in a direction indicated by arrow 24 with an axis extending substantially vertically (in a direction perpendicular to the surface of the paper in FIG. 1) as a center. A plurality (twelve in the illustrated case) of nearly semi-circular holder notches 28 are formed in the periphery of the turret 26 in the circumferential direction at an equal distance. Container closure shells 32 fed through an introduction chute 30 are partly held by the holder notches 28, conveyed in a direction indicated by arrow 24 with the turning of the turret 26, and are fed to each of the molding means 8 in the container closure receiving zone 10. Owing to a locking wall 34 extending along the periphery of the turret 26 from the downstream side of the introduction chute 30 to the upstream side of the container closure shell receiving zone 10, the container closure shells 32 are prevented from escaping the holder notches 28 outwardly in a radial direction while, after they are introduced into the holder notches 28 from the introduction chute 30, they are conveyed, in the direction indicated by arrow 24, up to the container closure shell receiving zone 10. A stationary support board 36 is disposed underneath the turret 26, and is provided with a high-frequency induction heating coil 38. The coil 38 is served with a high frequency from a high frequency generator 40 so as to heat the container closure shells 32 that are conveyed by the turret 26. The container closure shell 32 may be made of a suitable thin metal plate such as a thin aluminum plate, a thin steel plate treated with chromic acid or a thin tin-plated steel plate (or may be made of a suitable synthetic resin). and has, as shown in FIG. 6, a circular top panel 42 and a cylindrical skirt wall 44 that downwardly extends from the top panel 42. Engaging means such as a female thread or a lug may be formed on the skirt wall 44. The resin material feeding means 20 which is illustrated includes an extruder 46 that may be an ordinary one a feeding nozzle 48, and a flexible conduit 50 that connects an outlet port of the extruder 46 with an inlet port of the feeding nozzle 48. The feeding nozzle 48 is equipped with a pneumatic pressure cylinder mechanism 51 and is selectively positioned at either an acting position indicated by a solid line or a non-acting position indicated by a two-dot chain line. The molten synthetic resin material extruded from the extruder 46 is fed to the feeding nozzle 48 through the flexible conduit 50, discharged through a discharge port of the feeding nozzle 48, and fed to the molding means 8 (the feeding nozzle 48 will be described later in further detail). The container closure discharge means 22 that is disposed in relation to the container closure discharge zone 16 is constituted by a rotary turret mechanism like the aforementioned container closure shell feeding means 18. That is, it includes a turret 54 that continuously rotates in a direction of arrow 52 with an axis extending substantially vertically (in a direction perpendicular to the surface of paper in FIG. 1) as a center. A plurality (twelve in the illustrated case) of nearly semi-circular holder notches 56 are formed in the periphery of the turret 4 at an equal distance in the circumferential direction. A container closure 58 (which has an annular liner formed as will be described later) discharged from the molding means 8 at the container closure discharge zone 16 is partly held by the holding notch 56 of the turret 54, conveyed in a direction indicated by arrow 52 with the turning of the turret 54, and is conveyed to a delivery chute 60. Owing to a locking wall 59 that extends along the periphery of the turret 54, the container closure 58 is prevented from escaping the holder notch 56 outwardly in the radial direction while it is conveyed by the turret 54 from the downstream side of the container closure discharge zone 16 up to the upstream side of the delivery chute 60. A stationary support board 61 is disposed underneath the turret 54, and the container closure 58 that has been conveyed by the turret 54 slides on the support board 61. The container closure 58 delivered to the delivery chute 60 by the container closure discharge means 22 is then conveyed to a suitable place such as an inspection zone or a collection zone through the delivery chute 60. The rotary turret mechanism that constitute the container closure shell feeding means 18 and the container closure discharge means 22 is widely known among people skilled in the art, and therefore is not described in detail in this specification.

Figure 2:
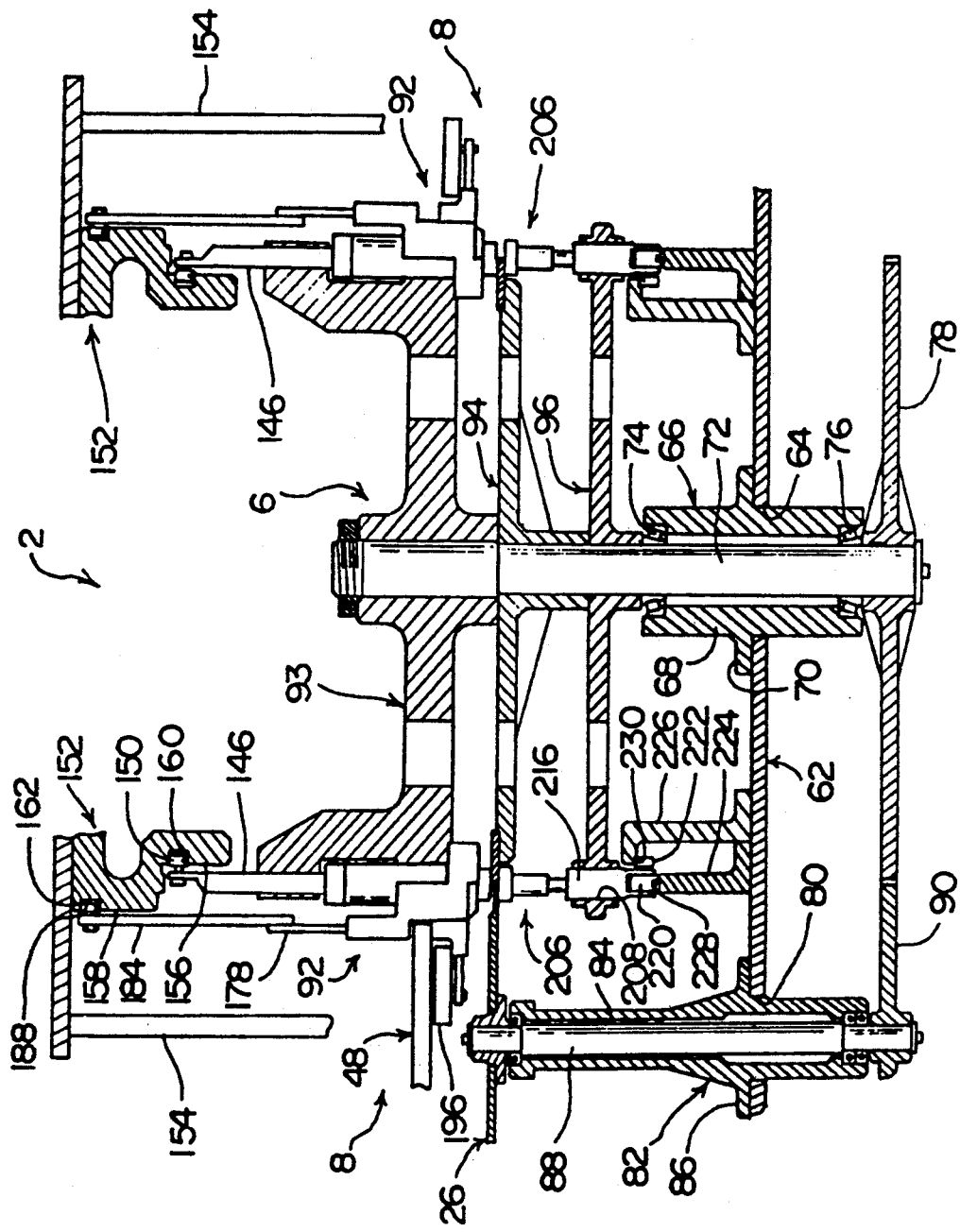
FIG. 2 is a sectional view showing a main rotary molding device in the apparatus for forming an annular liner of FIG. 1.

Now the main rotary molding device (2) will be explained. With reference to FIG. 2 together with FIG. 1, a circular opening 64 is formed at a central portion of a stationary support board 62 that extends substantially horizontally, and a cylindrical stationary support member 66 is secured to the opening 64. The support member 66 has a cylindrical main portion 68 that extends substantially vertically passing through the opening 64 and a flange 70 which extends in the radial direction from the outer peripheral surface at a middle portion of the main portion 68. The flange 70 is fastened to the support board 62 by a suitable means (not shown) such as fastening screws. A rotary shaft 72 is rotatably fitted into the cylindrical main portion 68 of the support member 66 via an upper bearing 74 and a lower bearing 76 and extends substantially vertically passing through the main portion 68. A coupling gear 78 is secured to the lower end of the rotary shaft 72.

A circular opening 80 is formed in the support board 62, and a stationary support member 82 is secured to the opening 80. The support member 82 has a cylindrical main portion 84 and a flange 86 that extends in the radial direction from the outer peripheral surface of the main portion 84. The flange 86 is fastened to the support board 62 by a suitable means (not shown) such as fastening screws. A rotary shaft 88 that extends substantially vertically is rotatably fitted to the support member 82, and the turret 26 in the container closure shell feeding means 18 is fixed to the upper end of the rotary shaft 86. A coupling gear 90 is fastened to vertically is rotatably fitted to the support member 82, and the turret 26 in the container closure shell feeding means 18 is fixed to the upper end of the rotary shaft 86. A coupling gear 90 is fastened to the lower end of the rotary shaft 88 and is engaged with the gear 78 fastened to the rotary shaft 72. Moreover, though not illustrated, the turret 54 in the container closure discharge means 22 is fastened to the upper end of the rotary shaft that extends substantially vertically, and the rotary shaft is rotatably fitted to the support board 62 via a support member similar to the above support member 82. A coupling gear is also fastened to the lower end of the rotary shaft and is engaged with the above gear 78 fastened to the rotary shaft 72. The gear 78 is drivably coupled to a rotary drive source (not shown) which may be an electric motor, and is continuously rotated in a direction indicated by arrow 4 in FIG. 1. The rotation is transmitted to the turret 26 in the container closure shell feeding means 18 via the gear 90, and is also transmitted to the turret 54 in the container closure discharge means 22 via a gear that is not shown. Thus, the turrets 26 and 54 are rotated in the directions indicated by arrows 24 and 52 in FIG. 1.

To the rotary shaft 72 are fastened three rotary boards that constitute the above rotary support member 6 of the main rotary molding device, i.e., an upper rotary board 93, an intermediate rotary board 94 and a lower rotary board 96. The above-mentioned molding means 8 is mounted on the rotary boards 93, 94 and 96.

Figure 3:
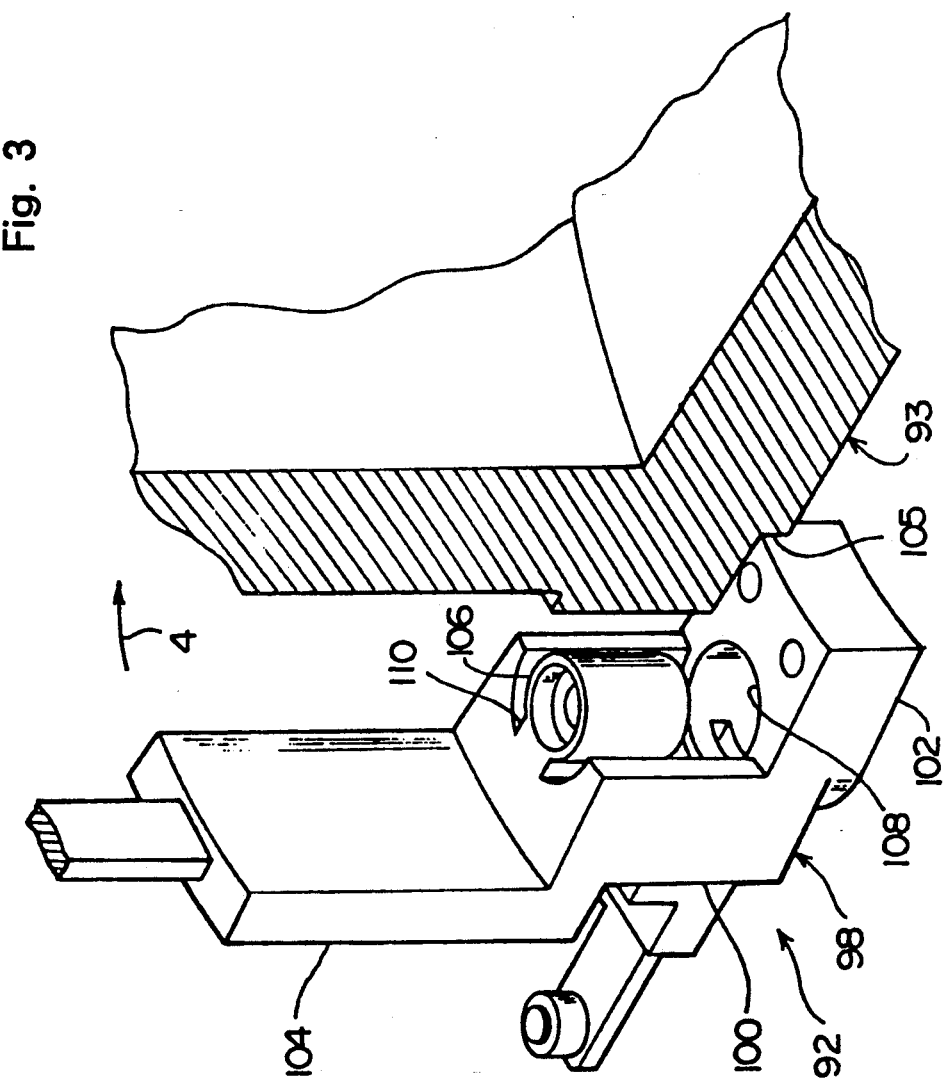
FIG. 3 is an oblique sectional view showing a partial portion of a press tool assembly of a molding means in which is disposed the main rotary molding device in the apparatus for forming an annular liner of FIG. 1.
Figure 4:
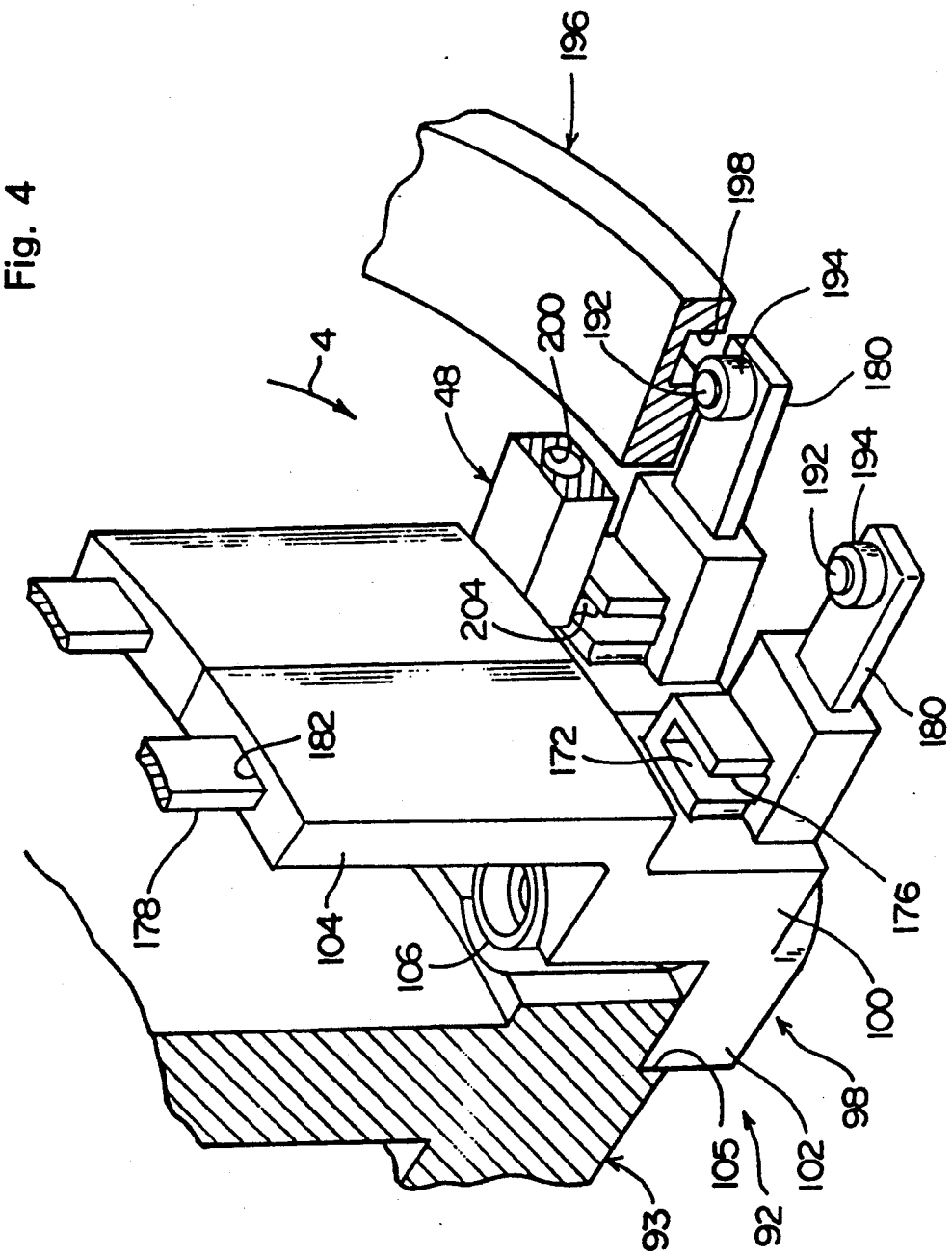
FIG. 4 is an oblique sectional view, similar to FIG. 3, showing a partial portion of the press tool assembly of the molding means in which is disposed the main rotary molding device in the apparatus for forming an annular liner of FIG. 1.
Figure 5:
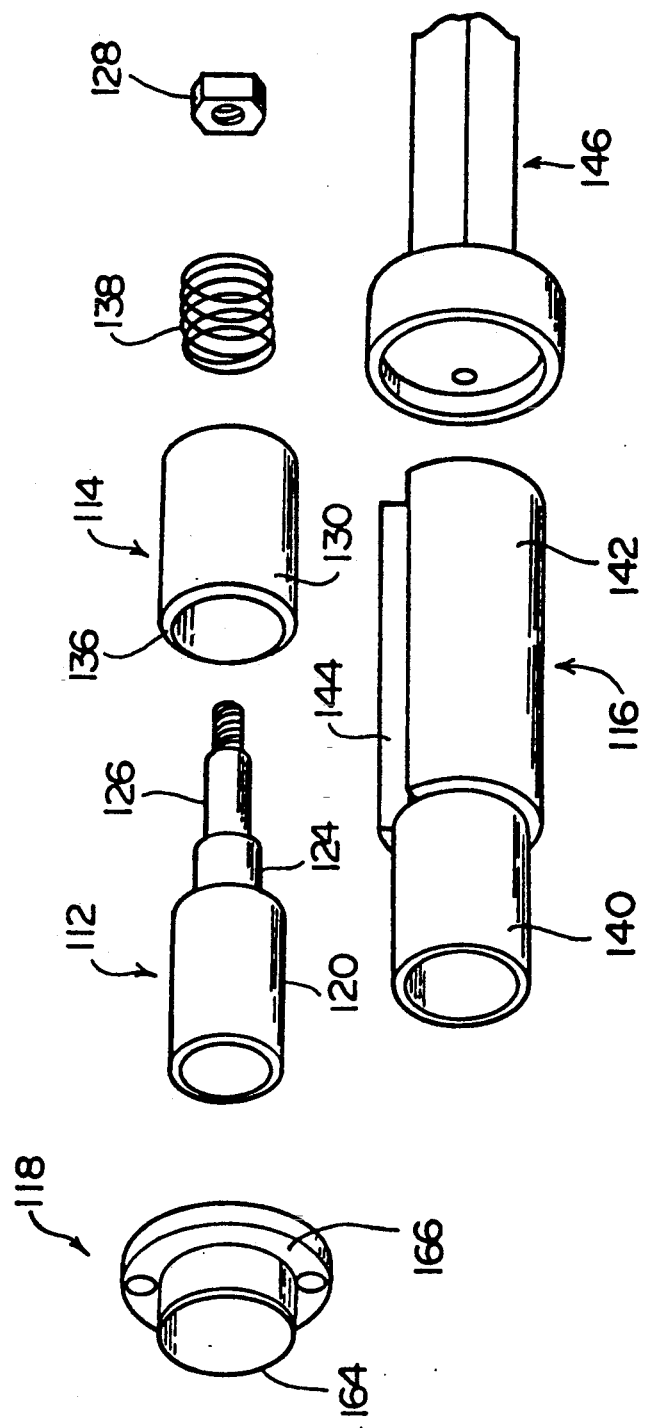
FIG. 5 is an oblique sectional view showing, in a disassembled manner, a partial portion of the press tool assembly of the molding means in which is disposed the main rotary molding device in the apparatus for forming an annular liner of FIG. 1.

With reference to FIGS. 3, 4 and 6 as well as FIG. 2, press tool assemblies 92 of the molding means 8 are mounted on the outer periphery of the upper rotary board 93. Each press tool assembly 92 includes a support member 98 which has a main portion 100, a coupling portion 102 that inwardly protrudes in the radial direction from the lower end of the main portion 100, and an upper protruded portion 104 that upwardly extends from the upper end of an outside portion in the radial direction of the main portion 100. An annular notch 105 is formed in the outer peripheral lower end portion of the rotary board 93, the coupling portion 102 of the support member 98 is brought into engagement with the notch 105, and the fastening screws (not shown) are screwed into the rotary board 93 from the lower direction through the coupling portion 102, in order to fasten the support member 98 to the rotary board 93. In the main portion 100 of the support member 98 are formed a support member 106 on nearly a cylindrical shape and a circular hole 108 under the support portion 106. The support portion 106 is connected to other portion of the support member 98 via a connection portion 110 that extends outwardly in the radial direction from the outer peripheral surface of the support member 106 in the radial direction. With reference to FIG. 5 as well as FIGS. 3, 4 and 6, the main portion 100 of the support member 98 is fitted with a punch member 112, an excess resin counter member 114, a bushing member 116 and a sleeve member 118. The punch member 112 has a lower portion 120 with a relatively large diameter, an intermediate portion 124, and an upper portion 126 with a relatively small diameter. The upper portion 126 has an outer diameter that corresponds to the inner diameter of the support portion 106 in the support member 98, and is inserted in the support portion 106 from the lower direction. A nut 128 is screwed into the upper end of the punch member 112 that upwardly protrudes beyond the support portion 106. As clearly illustrated in FIG. 6, a blind hole 127 is formed in the central portion of the punch member 112, extending from the upper end thereof up to nearly the lower end thereof, and a tubular member 129 is arranged in the blind hole 127 in concentric therewith. The upper end of the tubular member 129 is connected to a cooling medium feeding source (not shown) via a flexible hose (not shown), and the upper end of the blind hole 127 is connected to a cooling medium collector (not shown) via a flexible hose (not shown). A cooling medium which may be the water circulates through the tubular member 129 and the blind hole 127, so that the punch member 112 is cooled. The excess resin counter member 114 has a cylindrical main portion 130 that surrounds the lower portion 120 of the punch member 112 and an annular flange 132 that inwardly extends in the radial direction from the upper end of the main portion 130. The annular flange 132 of the excess resin counter member 114 is positioned on the upwardly faced annular shoulder surface that exists in a boundary region between the lower portion 120 and the intermediate portion 124 of the punch member 112. The outer peripheral surface 136 at the lower end of the main portion 130 of the excess resin counter member 114 has the shape of an inverted circular truncated cone that is downwardly and inwardly tilted in the radial direction. A resiliently urging means 138 which may be a compression coiled spring is disposed between the support portion 106 of the support member 98 and the annular flange 132 of the excess resin counter member 114. The resiliently urging means 138 resiliently urges the excess resin counter member 114 and the punch member 112 downwardly. The descending motion of the punch member 112 is restricted as the nut 128 fitted to the upper end thereof comes in contact with the upper end surface of the support portion 106 of the support member 98, and the descending motion of the excess resin counter member 114 is restricted as the annular flange 132 comes in contact with the annular shoulder surface of the punch member 112. The bushing member 116 has a main portion 140 which surrounds the lower portion 120 of the punch member 112 and the main portion 130 of the excess resin counter member 114. The main portion 140 of the bushing member 116 has an outer diameter which corresponds to an inner diameter of the circular hole 108 formed in the support member 98, and the main portion 140 of the bushing member 116 is slidably inserted in the circular hole 108. The bushing member 116 further has an extending portion 142 that upwardly extends from the main portion 140. As clearly shown in FIG. 5, a slit 144 that extends in the axial direction is formed in the extending portion 142 of the bushing member 116, the extending portion 142 having an arcuate shape in transverse section. The extending portion 142 of the bushing member 116 upwardly extends surrounding the support portion 106 of the support member 98, and the connection portion 106 of the support member 98 is positioned in the slit 144. As shown in FIG. 2, the extending portion 142 of the bushing member 116 upwardly protrudes beyond the support portion 106 of the support member 98, and to the upper end thereof is linked the lower end of a linking rod 146 by a suitable linking means (not shown) such as a fastening screw. A horizontally extending short shaft is fitted to the upper end of the linking rod 146, and a cam roller 150 is rotatably fitted to the above short shaft. An annular stationary cam member 152 is disposed over the rotary board 93. The cam member 152 is secured to the stationary support board 62 via a plurality of pole braces 154. The cam member 152 has a lower cam peripheral surface 156 and an upper cam peripheral surface 158, an annular cam groove 160 is formed in the lower cam peripheral surface 156, and an annular cam groove 162 is formed in the upper cam peripheral surface 158. The cam roller 150 is held in the annular cam groove 160. When the molding means 8 is rotated in a direction indicated by arrow 4 in FIG. 1 as will be described later, the bushing member 116 moves up and down as required by the actions of the annular cam groove 160 and the cam roller 150 that work in cooperation together. The annular cam groove 162 formed in the upper cam peripheral surface 158 will be described later. The sleeve member 118 has a cylindrical main portion 164 and an annular flange 166 that outwardly extends in the radial direction from the upper end of peripheral surface of the main portion 164. An annular notch i.e., a large-diameter portion is formed in the lower end of the circular hole 108 of the support member 98, the upper portion of the sleeve member 118 is positioned in the large-diameter portion, and a fastening screw (not shown) is screwed to the support member 98 from the lower direction via the annular flange 166 of the sleeve member 118 in order to fasten the sleeve member 118 to the support member 98. The inner diameter of the sleeve member 118 is substantially the same as the inner diameter of the circular hole 108 of the support member 98, and the main portion 140 of the bushing member 116 moves up and down inside the sleeve member 118 and the circular opening 108.

With reference to FIG. 6 as well as FIGS. 3 and 4, the resin flow path 168 and the means 170 for forcibly flowing the resin are mounted on the support member 98 of the press tool assembly 92. The illustrated resin flow path 168 formed in the main portion 100 of the support member 98 has a vertical portion 172 that extends substantially vertically and downwardly from an open upper end and a horizontal portion 174 that extends substantially horizontally from the lower end of the vertical portion 172 up to the circular hole 108 or up to space where the main portion 140 of the bushing member 116 moves up and down. As will be understood with reference to FIG. 4, the vertical portion 172 and horizontal portion 174 of the resin flow path 168 have a rectangular shape in cross section, and a notch 176 is formed open in the upper half portion of the vertical portion 172(i.e., in the upstream end of the resin flow path 168) on the downstream side as viewed in the direction of rotation indicated by arrow 4. The means 170 for forcibly flowing the resin includes a vertical push rod 178 and a horizontal push rod 180. The upper protruded portion 104 of the support member 98 upwardly extends substantially vertically starting from the lower end that locates in a predetermined distance over the upper end of the vertical portion 172 of the resin flow path 168. In the upper protruded portion 104 is formed a through a hole 182 that extends substantially vertically in match with the vertical portion 172 of the resin flow path 168. The vertical push rod 178 is slidably inserted in the through hole 182. The through hole 182 and the vertical push rod 178 have a rectangular shape in cross section that matches with the sectional shape of the resin flow path 168. As shown in FIG. 2, the vertical push rod 178 upwardly extends beyond the upper protruded portion 104 of the support member 98, and the lower end of a linking rod 184 is linked to the upper end of the vertical push rod 178 by a suitable linking means (not shown) such as a fastening screw. A horizontally extending short shaft is fitted to the upper end of the linking rod 184, and a cam roller 188 is rotatably fitted to the short shaft. The cam roller 188 is held in an annular cam groove 162 formed in the upper peripheral surface 158 of the annular stationary cam member 152. Thus, as will be further described later, when the molding means 8 is rotated in the direction indicated by arrow 4 in FIG. 1, the vertical push rod 184 suitably moves up and down by the actions of the annular cam groove 162 and the cam roller 188 that work in cooperation together. The vertical push rod 178 enters into the vertical portion 172 of the resin flow path 168 and causes the synthetic resin material to flow through the vertical portion 172 of the resin flow path 168. As shown in FIGS. 4 and 6, the horizontal portion 174 of the resin flow path 168 has an additional portion 190 that extends substantially horizontally from the lower end of the vertical portion 172 outwardly in the radial direction up to the outer peripheral surface of the support member 98, and the horizontal push rod 180 is slidably inserted in the additional portion 190. The additional portion 190 and the horizontal push rod 180 have a rectangular shape in cross section that meets the sectional shape of the resin flow path 168. The horizontal push rod 180 extends outwardly in the radial direction exceeding the outer peripheral surface of the support member 98 and has a vertically extending short shaft 192 attached to the end thereof, the cam roller 194 is rotatably mounted on the short shaft 192. An annular stationary cam member 196 (see FIG. 1, too) is disposed on the outside of the molding means 8. The annular stationary cam member 196 is secured to the stationary support board 62 via a suitable linking member (not shown). An annular cam groove 198 is formed in the lower surface of the stationary annular cam member 916, and the cam roller 914 is held in the annular cam groove 198. When the molding means 8 rotates in the direction indicated by arrow 4 in FIG. 1, the horizontal push rod 180 is suitably moved in the radial direction by the action of the annular cam groove 198 and the cam roller 194 the work in cooperation together. The horizontal push rod 180 enters into the horizontal portion 174 of the resin flow path 168 and causes the synthetic resin material to flow through the horizontal portion 174 of the resin flow path 168.

As described with reference to FIG. 1, the resin material feeding means 20 provided in relation to the resin material receiving zone 12 includes the feeding nozzle 48 which is selectively located at the acting position indicated by a solid line in FIG. 1. When the feeding nozzle 48 is located at the acting position as shown in FIG. 6, the tip of the feeding nozzle 48 is protruded into the locus of space between the upstream end (upper end of the vertical portion 172) of the resin flow path 168 formed in the support member 98 of the press tool assembly 92 in the molding means 8 and the lower end of the upper protruded portion 104. A resin discharge path 200 is formed in the feeding nozzle 48, and a resin discharge port 202 is positioned in the lower surface at the tip of the feeding nozzle 48, and is faced to the upstream end of the resin flow path 168 in the press tool assembly 92, i.e., the upper end of the vertical portion 172. As will be described later, when the molten synthetic resin material is supplied to the press tool assembly 92, the molten synthetic resin material 204 is discharged from the discharge port 202 of the feeding nozzle 48. A notch 176 is formed in the upper end of the resin flow path 168 (upper half portion of the vertical portion 172) in the press tool assembly 92 on the downstream side as viewed in the direction of rotation indicated by arrow 4 in FIG. 1, and hence, the synthetic resin material 204 is discharged from the discharge port 202 of the feeding nozzle 48 enters into the resin flow path 168 from the notch 176. The notch 176 is formed only on the downstream side in the direction of rotation, and a wall exists on the upstream side to define the resin flow path 168. At a moment when the press tool assembly 92 passes the resin material receiving zone 12, therefore, the synthetic resin material 204 that has entered into the upstream end of the resin flow path 168 is cut away from the discharge port 202 of the feeding nozzle 48 by the action of the lower surface of the feeding nozzle 48 and the wall at the upstream end of the resin flow path 168 that work in cooperation together. In the illustrated embodiment, the discharge port 202 is formed in the lower surface of the feeding nozzle 48, and the upstream end of the resin flow path 168 is positioned under the discharge port 202. As required, however, it is also allowable to form the discharge port in the upper surface of the feeding nozzle 48 and place the upstream end of the resin flow path over the discharge port in a manner opposed thereto (the resin flow path can be extended upwardly from the upstream end and then inwardly in the radial direction).

Each of the molding means 8 includes an anvil 206 that works is cooperation with the press tool assembly 92. With reference to FIG. 6 as well as FIG. 2, a plurality of circular openings 208 are formed in the outer peripheral portion of the lower rotary board 96 of the rotary support member 6 at intervals in the circumferential direction. Each of the openings 208 are corresponded to each of the press tool assemblies 92. Moving-up-and-down members 216 are inserted in the openings 208 to move up and down. A horizontally extending short shaft is fitted to the lower end of the moving-up-and-down member 215 that has a cylindrical peripheral surface, and cam rollers 220 and 222 are rotatably mounted on the above short shaft. Annular cam members 224 and 226 are secured to the stationary support board 62. The cam roller 220 comes in contact with a cam surface (i.e., annular upper surface) 228 of the annular cam member 224, and the cam roller 222 comes in contact with a cam surface (i.e., lower surface of he annular flange portion) 230 of the annular cam member 226. While the rotary support member 6 is rotated in the direction indicated by arrow 4 in FIG. 1, the moving-up-and-down member 216 is caused to move up or down as required by the actions of the cam rollers 220, 222 and the annular cam members 224, 226 that work in cooperation together. An anvil member 252 is mounted on the moving-up-and-down member 216 via a resiliently rugging means (not shown) which may be a compression coiled spring. The anvil member 252 has an upper portion 254 with a relatively large diameter and a lower portion 256 with a relatively small diameter, the upper portion 254 having a circular upper surface 258. A blind hole 260 is formed in the anvil member 252 from the lower surface thereof up to nearly the upper end thereof, and a tubular member 234 is provided in the blind hole 260 in concentric therewith. As will be described later, the container closure shell 32 is fed in an inverted manner from the container shell feeding means 18 onto the upper surface 258 of the anvil member 252 in the container closure shell receiving zone 10 (FIG. 1). The tubular member 234 is connected to the cooling medium feeding source (not shown) via a flexible hose (not shown), and the blind hole 60 of the anvil member 252 is connected to the cooling medium collector (not shown) via a flexible hose (not shown). Thus, the cooling medium which may be the water circulates through the tubular member 234 and blind hole 260, so that the anvil member 252 is suitably cooled, i.e., the container closure shell 32 placed on the upper surface 258 of the anvil member is suitably cooled.

An annular turret 264 is secured to the peripheral edge of the intermediate rotary board 94 of the rotary support member 6. A plurality of nearly semi-circular holder notches 266 (FIG. 1) are formed in the peripheral edge portion of the turret 264 at an equal distance in the circumferential direction, and the container closure shells on the upper surfaces 258 of the anvil members 252 are placed in the holder notches 266. The turret 264 is surrounded by a stationary guide member 268 which arcuately extends from the downstream side of the container closure shell feeding zone 10 to the upstream side of the container closure discharge zone 16 (see FIG. 1). The stationary guide member 268 is secured to the stationary support board 62 via a suitable support member (not shown). The container closure shell 32 fed onto the upper surface 258 of the anvil member 252 moves together with the anvil member 252 while it is locked by the turret 264 and the stationary guide member 268 relative to which the anvil member 252 moves.

Next, the action of the main rotary molding device 2 will be described by reference to FIGS. 6 to 13 as well as FIGS. 1 and 2. When the molding means 8 passes the container closure shell feeding zone 10 with the turn of the rotary support member 6 of the main molding device 2, the press tool assembly 92 in the molding means 8 and the anvil 206 are positioned separately from each other (see FIG. 6), and the container closure shell 32 fed from the container closure shell feeding means 18 is placed on the anvil 206 or, more specifically, on the upper surface 258 of the anvil member 252. The container closure shell 32 is placed on the anvil 206 in an inverted manner, i.e., with the lower end of the shirt wall 44 being faced upwards.

Then, when the molding means 8 moves passing the resin material receiving zone 12, the synthetic resin material 204 which is softened and melted is supplied to the press tool assembly 92. If described in detail with reference to FIG. 6, the softened and molten synthetic resin material 204 of a predetermined amount is discharged in the course of from the discharge port 202 of the feeding nozzle 48 in the resin material feeding means 20 from a moment when a preceding molding means 8 has passed the resin material receiving zone 12 up to a moment when a next molding means arrives at the resin material receiving zone 12. On the other hand, when the molding means passes the resin material receiving zone 12 the vertical push rod 178 of the means 170 for forcibly flowing the resin in the press tool assembly 92 is located at the uppermost ascended position and the lower end of the vertical push rod 178 is located in the through hole 182 formed in the upper protruded portion 104 of the support member 98. Therefore, when the molding means 8 passes the resin material receiving zone 12, the tip of the feeding nozzle 48 is relatively moved passing through space between the upper protruded portion 104 and the upstream end of the resin flow path 168 (upper end of the vertical portion 172) formed in the support member 98 without interfered by the vertical push rod 178. The horizontal push rod 180 of the means 170 for forcibly flowing the resin is at a position of the outermost side, and the inside end thereof is located at a position which is on the outside of the vertical portion 172 of the resin flow path 168 in the radial direction. Furthermore, the bushing member 116 in the press tool assembly 92 is located at the uppermost position, and the lower end thereof is located over the horizontal portion 174 of the resin flow path 168. When the molding means 8 passes the resin material receiving zone 12 as described already the synthetic resin material 204 discharged from the discharge port 202 of the feeding nozzle 48 enters into the upstream portion of the resin flow path 168 (upper portion of the vertical portion 172) through the notch 176, and is cut away from the discharge port 202 of the feeding nozzle 48 by the lower surface of the feeding nozzle 48 and the arcuate wall defining the upstream portion of the resin flow path 168 that work in cooperation together. Thus, the synthetic resin material 204 of a required amount is fed to the upstream portion of the resin flow path 168.

Figure 7:
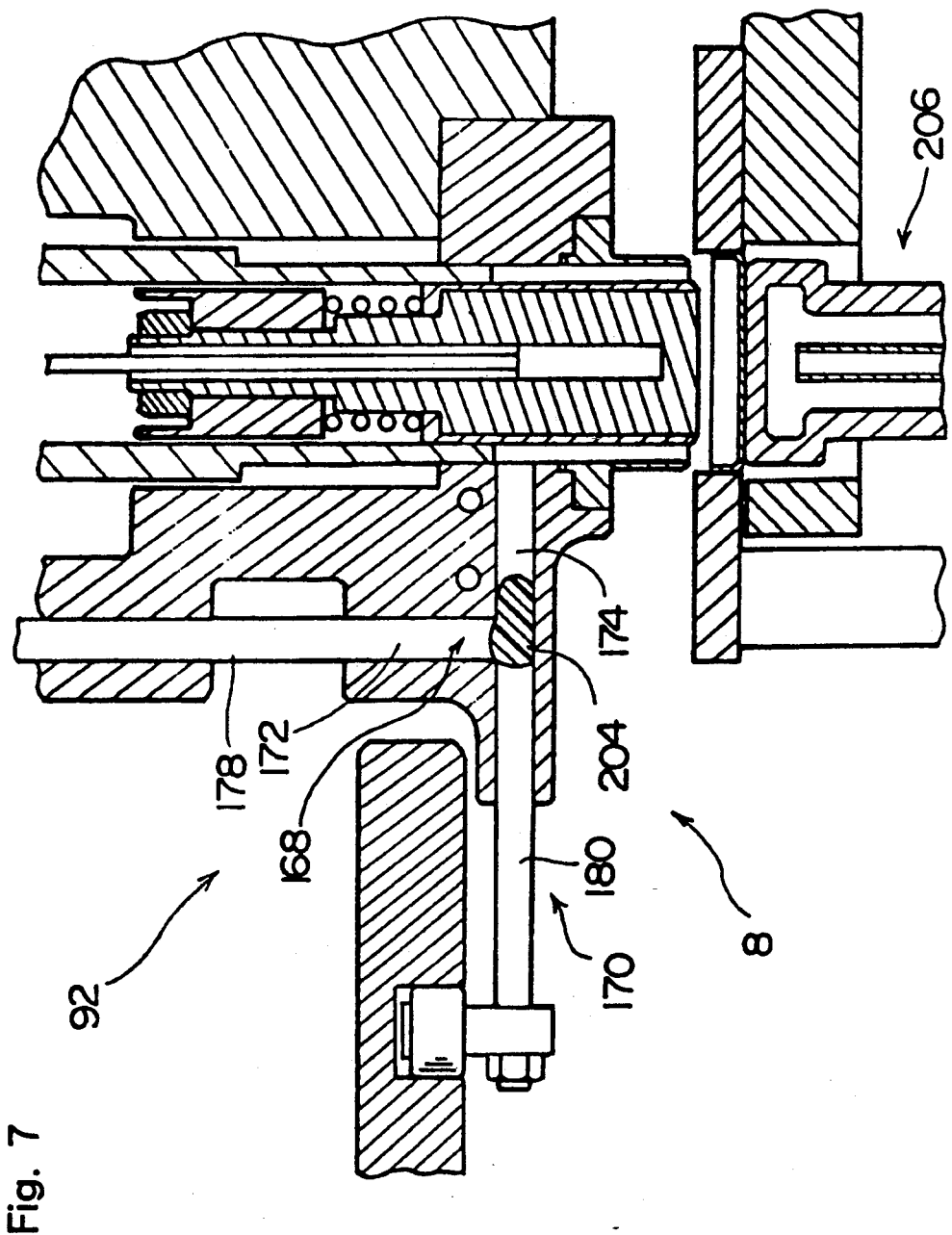
FIG. 7 is a partial sectional view, similar to FIG. 6 for explaining the action of the main rotary molding device of FIG. 2.
Figure 8:
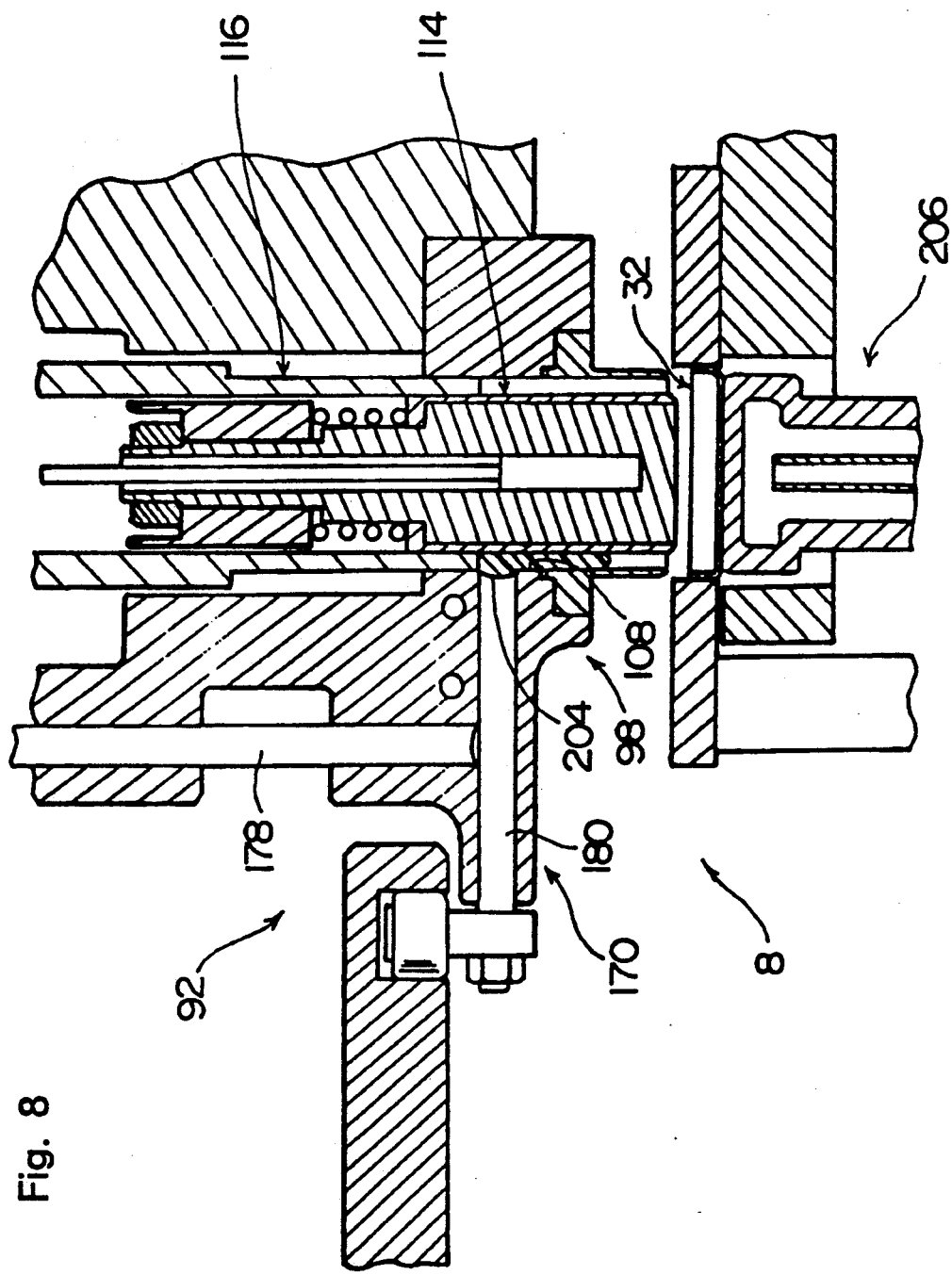
FIG. 8 is a partial sectional view similar to FIG. 6 for explaining the action of the main rotary molding device of FIG. 2.
Figure 9:
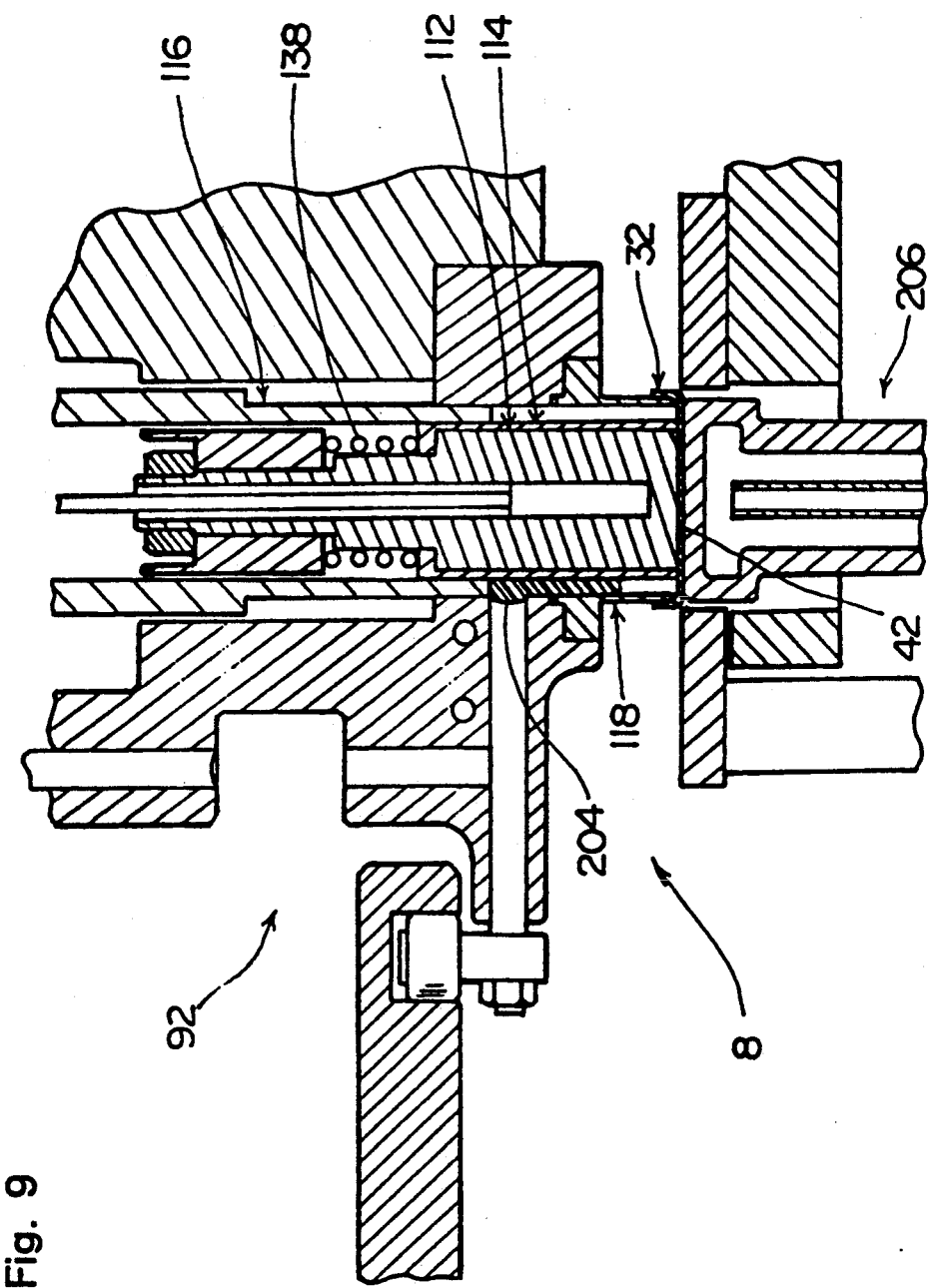
FIG. 9 is a partial sectional view, similar to FIG. 6, for explaining the action of the main rotary molding device of FIG. 2.
Figure 10:
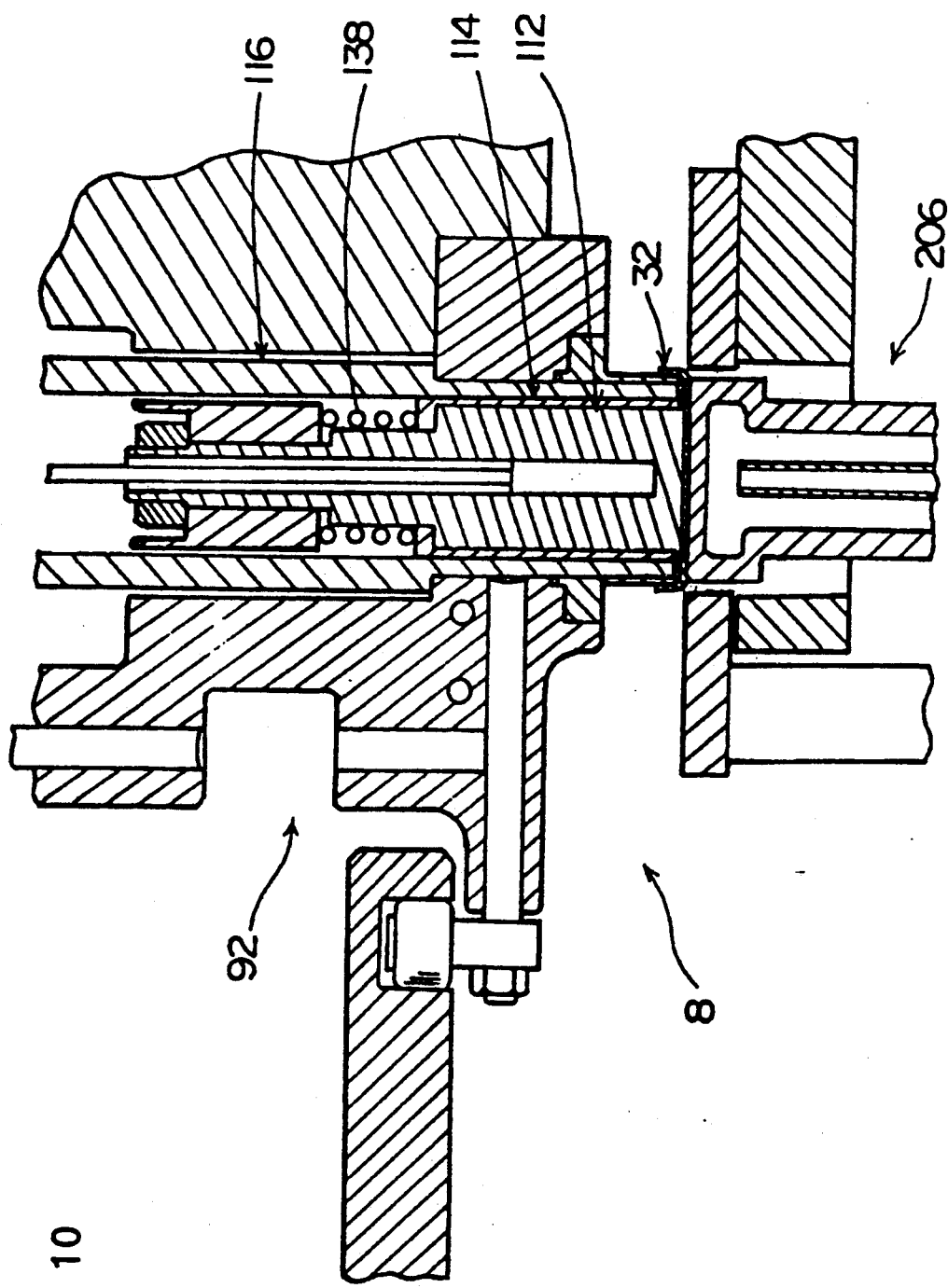
FIG. 10 is a partial sectional view, similar to FIG. 6, for explaining the action of the main rotary molding device of FIG. 2.

While the molding means 8 moves passing the molding zone 14, the vertical push rod 178 of the means 170 for forcibly flowing the resin is lowered to the most descended position as shown in FIG. 7, whereby the synthetic resin material 204 flows into the horizontal portion 174 from the vertical portion 172 of the resin flow path 168. Then, the horizontal push rod 180 of the means 170 for forcibly flowing the resin moves to a position of the innermost side as shown in FIG. 8, and the synthetic resin material 204 flows into space between the inner wall surface of the circular opening 108 of the support member 98 and the outer peripheral surface of the excess resin counter member 114 that is, flows into space in which the bushing member 116 moves up and down. As shown in FIG. 9, further, the anvil 206 is ascended to the uppermost position. When the anvil 206 is raised to the uppermost ascended position shown in FIG. 9, first, the lower surface of the punch member 112 comes in contact with the inner surface of the top panel 42 of the container closure shell 32, and the punch member 112 and the excess resin counter member 114 are raised to some extent against the resiliently urging action of the resiliently urging means 138 (the resiliently urging action of the resiliently urging means disposed in the anvil 206 is stronger than the resiliently urging action of the resiliently urging means 138 in the press tool assembly 92 and, hence, the resiliently urging means 138 is compressed before the resiliently urging means of the anvil 206 is compressed). When the anvil 206 is ascended to the uppermost position, the lower end of the sleeve member 118 of the press tool assembly 92 is brought into contact with the inner surface of the top panel 42 of the container closure shell 32. Then, as shown in FIG. 10 the bushing member 116 is lowered to the most descended position, whereby the synthetic resin material 204 is pressed onto the peripheral region on the inner surface of top panel 42 of the container closure shell 32 and is molded into an annular liner of a desired shape.

It is very difficult, although it is possible, to extremely precisely control the amount of the synthetic resin material 204 fed to the press tool assembly 92 in the resin material receiving zone 12, and the amount of the synthetic resin material 204 fed to the press tool assembly 92 undergoes a variation to a small degree. In the illustrated embodiment, the synthetic resin material 204 is fed to the press tool assembly 92 in an amount slightly in excess of the amount that is required for forming the annular liner. When the bushing member 116 is lowered to the lowermost descended position, a large pressure is exerted on the outer peripheral surface at the lower end of the excess resin counter member 114 of the shape of an inverted circular truncated cone which is downwardly and inwardly tilted in the radial direction since the synthetic resin material 204 is fed in a slightly excess amount and, in consequence, the excess resin counter member 114 slightly rises against the resiliently urging action of the resiliently urging means 138. Thus, a slightly extended portion is formed on the inside of inner periphery of the annular liner of a desired shape and thus the excess amount of the synthetic resin material 204 is compensated.

Figure 11:
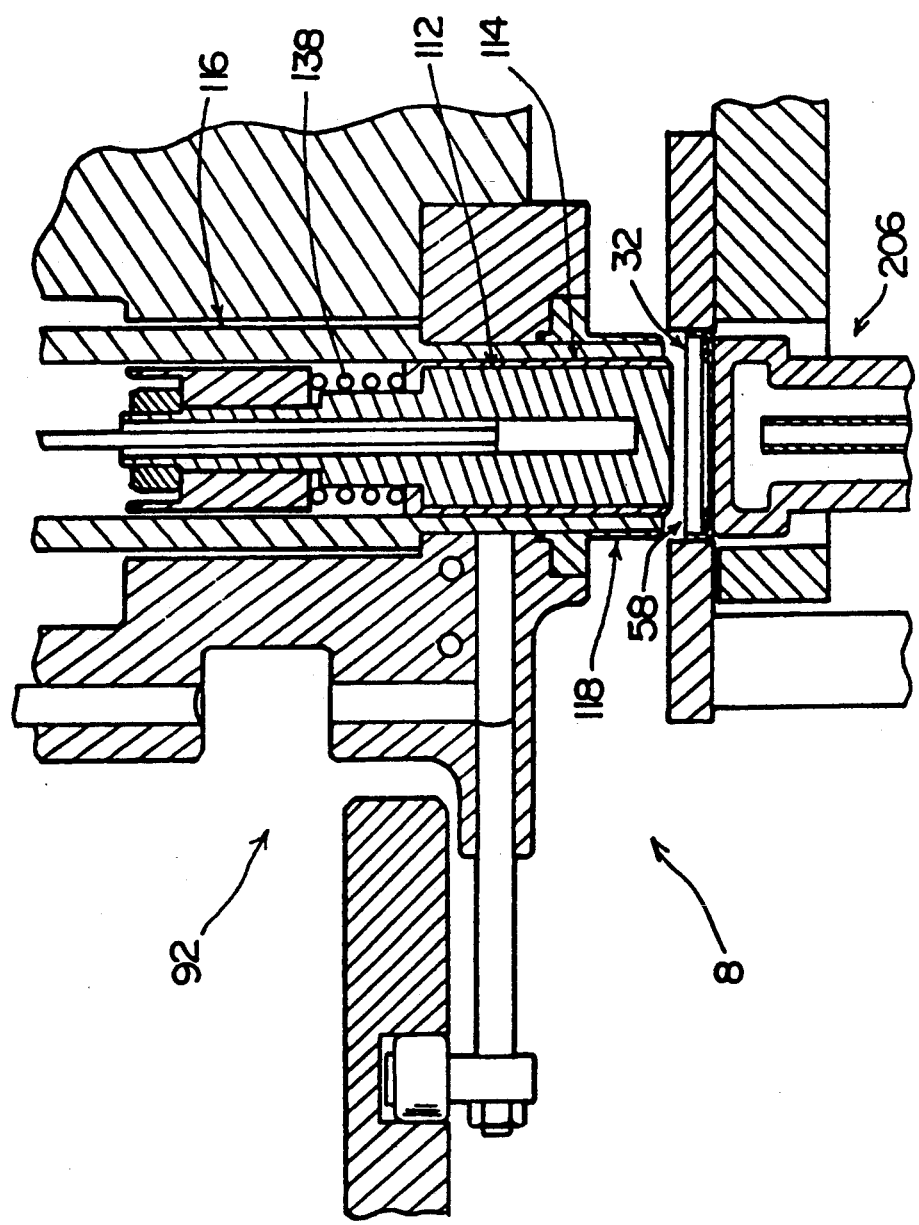
FIG. 11 is a partial sectional view, similar to FIG. 6, for explaining the action of the main rotary molding device of FIG. 2.
Figure 12:
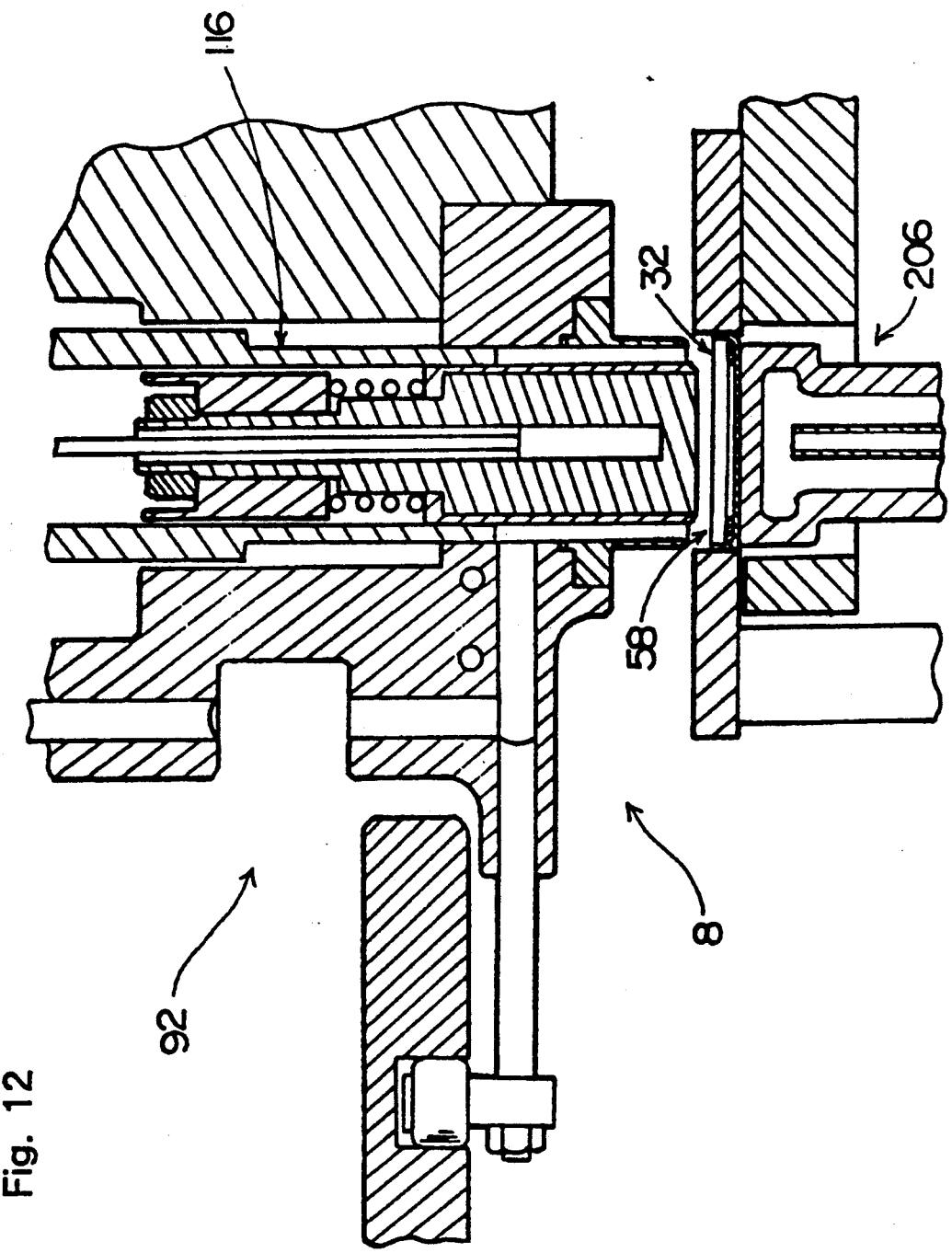
FIG. 12 is a partial sectional view, similar to FIG. 6, for explaining the action of the main rotary molding device of FIG. 2.
Figure 13:
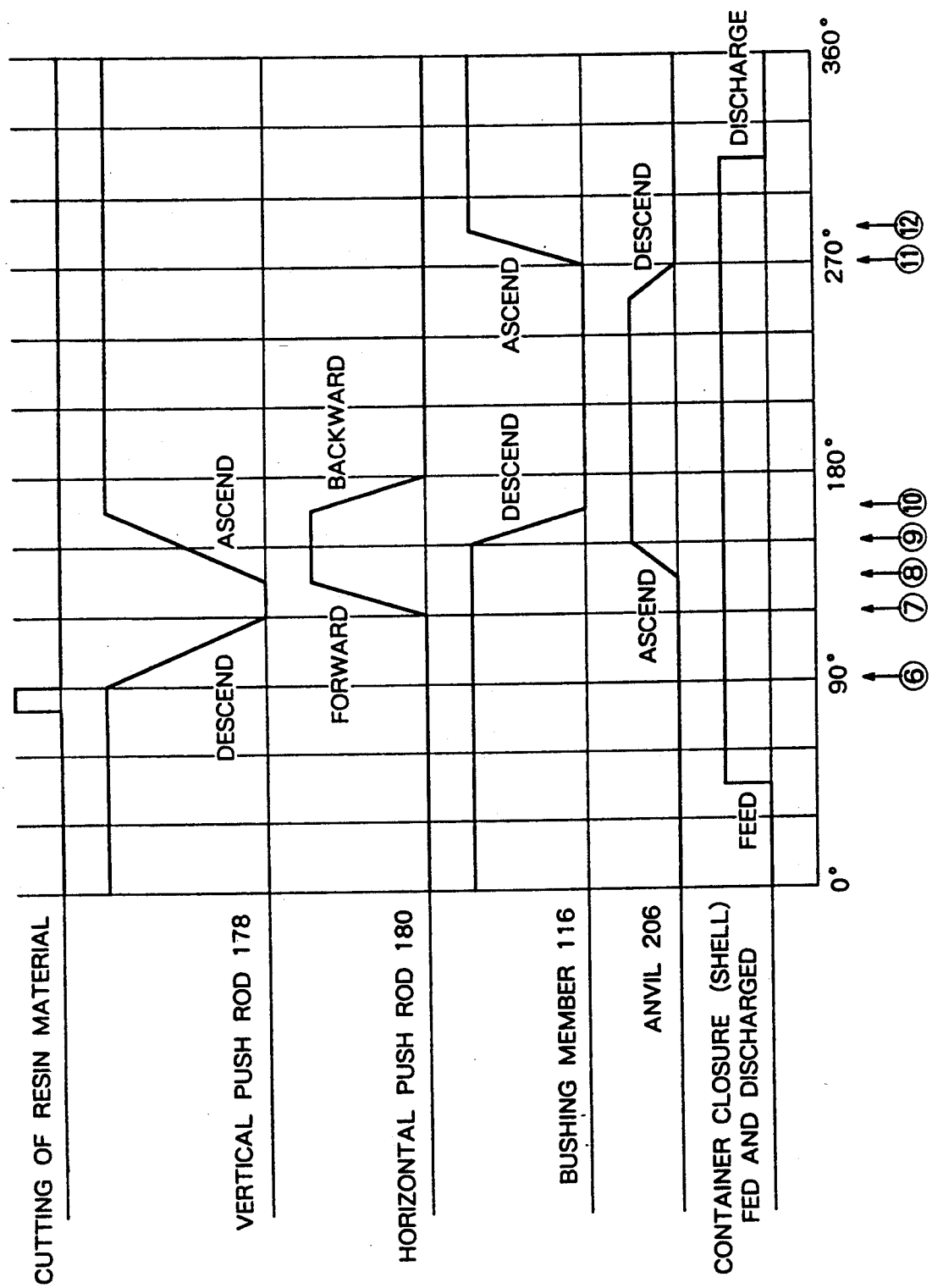
FIG. 13 is a diagram illustrating the actions of various constituent members in the main rotary molding device of FIG. 2, FIGS. 6 to 12 show the conditions of the sites, to which numerals 6 to 12 are assigned, of the main rotary molding device in FIG. 13.

After the molded annular liner is cooled to a required temperature, the anvil 206 is lowered as shown in FIG. 11, and the container closure shell 32 (i.e., container closure 58) having the thus molded annular liner is downwardly separated from the press tool assembly 92. In the initial state in which the anvil 206 descends, the punch member 112 and the excess resin counter member 114 gradually descend with the descending motion of the anvil 206 by the resiliently urging action of the resiliently urging means 138, and the container closure shell 32 is separated away from the sleeve member 118 very smoothly. Then, as shown in FIG. 12, the bushing member 116 in the press tool assembly 92 is raised to the uppermost position. When the molding means 8 passes the container closure discharge zone 16 the container closure 58 present on the anvil 206, i.e., the container closure 58 having annular liner formed on the inside surface of top panel 42 together with the container closure shell 32 is discharged into the container closure discharge means 22.

According to an apparatus for forming an annular liner of the present invention, the synthetic resin material is supplied to the press tool assembly in a peculiar manner and is forced to flow in order to form an annular liner. Since the synthetic resin material is fed and is caused to flow in a peculiar manner as described above, it is allowed by the apparatus of the present invention to form a desired annular liner on the inside surface of top panel of the container closure shell by very quickly feeding a required amount of the synthetic resin material without requiring complex and expensive mechanism.

Preferred embodiments of the apparatus for forming an annular liner constituted in accordance with the present invention were described above in detail in conjunction with the accompanying drawings, but it should be noted that the present invention is in no way limited to the above embodiments only but can be varied or modified in a variety of other ways without departing from the scope of the present invention.

What I claim is:

1. An apparatus for forming an annular liner on an inside surface of a container closure shell comprising;
   a molding means which is conveyed through a container closure shell receiving zone, a resin material receiving zone a molding zone and a container closure discharge zone
   a container closure shell feeding means which feeds a container closure shell having a circular top panel to said molding means in said container closure shell receiving zone;
   a resin material feeding means which feeds a synthetic resin material to said molding means in said resin material receiving zone; and
   a container closure discharge means which discharges the container closure consisting of a container closure shell and an annular liner formed on the inside surface of the top panel from said molding means in said container closure discharge zone; wherein
   said molding means includes an anvil on which the container closure shell is placed in an inverted state, and a press tool assembly which is disposed over said anvil being faced thereto and moveable in a direction to approach or separate away from said anvil;
   said press tool assembly includes a punch member, a cylindrical bushing member arranged on the outside of said punch member and a cylindrical sleeve member arranged on the outside of said bushing member, said bushing member being allowed to ascend or descend relative to said punch member and said sleeve member;
   said press tool assembly further includes a resin flow path that extends from an open upstream end up to a space where said bushing member ascends and descends between said punch member and said sleeve member, and a means for forcibly flowing the resin, and the upstream end of said resin flow path has a notch formed at a position on the downstream side in a direction in which said molding means moves;
   said resin material feeding means includes a feeding nozzle with a discharge port positioned to face said stream end of said resin flow path in said resin material receiving zone;

when said molding means moves through said resin material receiving zone, a molten synthetic resin material discharged from said discharge port of said feeding nozzle enters into said resin flow path through said notch and is cut away from said discharge port of said feeding nozzle and then, the synthetic resin material in the resin flow path flows through the resin flow path by the action of said means for forcibly flowing the resin; and in said molding zone, said bushing member is lowered with respect to said punch member and said sleeve member, and the synthetic resin material is pressed onto the inside surface of the top panel of the container closure shell and is molded into an annular liner.

2. An apparatus for forming an annular liner according to claim 1, wherein the upstream end of said resin flow path is opened and the discharge port of said resin material feeding means is positioned over said upstream end of said resin flow path in said resin receiving zone.

3. An apparatus for forming an annular liner according to claim 2, wherein said resin flow path of said press tool assembly has a vertical portion that extends substantially vertically from said upstream end and a horizontal portion that extends substantially horizontally following said vertical portion, and said means for forcibly flowing the resin includes a vertical push rod that enters into said vertical portion of said resin flow path substantially in the vertical direction and a horizontal push rod that enters into said horizontal portion of said resin flow path.

4. An apparatus for forming an annular liner according to claim 1, wherein said press tool assembly includes a cylindrical excess resin counter member that is disposed between said punch member and said bushing member.

5. An apparatus for forming an annular liner according to claim 4, wherein said excess resin counter member is allowed to move up and down, and is resiliently urged to the lowermost descended position.

* * * * *